United States Patent [19]

Klein

[11] Patent Number: 5,662,018

[45] Date of Patent: Sep. 2, 1997

[54] WORKING MACHINE FOR MATERIAL WEBS, PARTICULARLY PAPER FORMAT CROSS-CUTTER

[75] Inventor: Hansjörg Klein, Aichwald, Germany

[73] Assignee: bielomatik Leuze GmbH & Co., Germany

[21] Appl. No.: 442,947

[22] Filed: May 17, 1995

[30] Foreign Application Priority Data

May 19, 1994 [DE] Germany ............... 44 17 493.4

[51] Int. Cl.⁶ .................. B23D 25/12; F16H 55/18
[52] U.S. Cl. .................. 83/343; 83/674; 74/409
[58] Field of Search ............... 83/342, 343, 345, 83/672, 674; 74/409

[56] References Cited

U.S. PATENT DOCUMENTS

| | | |
|---|---|---|
| 2,258,816 | 10/1941 | Shields . |
| 2,345,411 | 2/1944 | Moeller . |
| 2,918,826 | 12/1959 | Miller ............... 74/409 X |
| 3,182,540 | 5/1965 | Eichorn et al. . |
| 3,415,138 | 12/1968 | Rumbarger et al. ............... 74/409 |
| 3,763,959 | 10/1973 | Neugebauer ............... 74/409 X |
| 3,844,179 | 10/1974 | Hawley ............... 74/409 |
| 4,072,064 | 2/1978 | Lloyd et al. ............... 74/409 |
| 4,470,331 | 9/1984 | Eiting et al. ............... 83/343 X |
| 4,493,235 | 1/1985 | Martin ............... 83/345 X |
| 4,881,436 | 11/1989 | Rommel ............... 83/342 |
| 4,912,998 | 4/1990 | Sugano et al. ............... 74/409 |
| 5,117,703 | 6/1992 | Mathes et al. ............... 74/409 |
| 5,152,186 | 10/1992 | Dettinger et al. ............... 74/409 X |

FOREIGN PATENT DOCUMENTS

| | | |
|---|---|---|
| 1524390 | 9/1968 | France . |
| 602721 | 9/1934 | Germany . |
| 3718776 | 8/1988 | Germany . |
| 3834429 | 12/1989 | Germany . |
| 4005028 | 8/1990 | Germany . |
| 642097 | 1/1979 | U.S.S.R. . |

*Primary Examiner*—Eugenia Jones
*Attorney, Agent, or Firm*—Quarles & Brady

[57] ABSTRACT

In a cross-cutter, particularly for small paper formats, having two knife shafts driven in synchronized opposing manner, provided with two knife sets, which are so mutually staggered on the two knife shafts that in a specific rotation position association of the two knife shafts only one of the sets engages, whereas the other knives pass through the cutting gap without cooperating with a corresponding counterknife. It is therefore possible for one knife shaft set to implement several synchronous lengths of cut by merely changing the reciprocal rotation position association of the knife shafts with respect to one another.

There is further provided a system for setting the backlash of the synchronizing gear to a minimum at several positions of a gear circumference by hydraulicly widening pockets in the gear body.

6 Claims, 5 Drawing Sheets

WORKING MACHINE FOR MATERIAL WEBS, PARTICULARLY PAPER FORMAT CROSS-CUTTER

BACKGROUND OF THE INVENTION

1. Field of the Invention

The invention relates to a working machine for material webs, particularly a paper format cross-cutter, with two machine parts rotatable in opposition and in particular knife shafts with knives on the circumference forming at least one knife set, the rotary machine parts being synchronized with one another by at least one gear pair having at least one gear body and a tooth system.

2. Description of Related Art

The term size or format cross-cutters is normally used for cross-cutters, which cut from material webs divided up into strips by different formats, e.g. the standard DIN A 3 of DIN A 4 formats. Normally two or three knives are located on each knife shaft and the knife shafts are so associated with one another that a cutting engagement is in each case produced between two knives set in matching manner.

Here and hereinafter the term cutting engagement is used to mean as association of the two knives which is such that there is a perfect cut between them. The knives need not and should not be in contact with one another.

The so-called synchronous length of cut between two cuts is determined by the circumferential distance between knives on the particular knife shaft, because it is necessary that during the cutting engagement the web speed and the peripheral speed of the knives coincide. Thus, only one format length can be cut during a uniform rotation of the knife shafts.

In order to allow a change to the format length, several knife shafts were provided for each machine, which had to be changed on modifying the format and required realignment with respect to the knife setting. Such a reequipping was very time and labour consuming and required a long machine shutdown.

Another possibility for changing the format length is known from DE-A-3,608,111, corresponding to U.S. Pat. No. 4,881,436. In this case the knife shafts are driven directly by direct current motors, which allow very precise and rapid speed changes and optionally also several times per shaft rotation. As a result of this drive with varying velocity ratio it is possible to delay the knife shafts, e.g. between two cutting engagement positions, whilst the material web continues to run at a uniform speed. As a result, the length of cut increases and diverges from the synchronous format. Such periodic decelerations and accelerations of the knife shafts were previously also brought about using mechanical drives with varying velocity ratios. This solution with a drive having a varying velocity ratio is very flexible with respect to the lengths to be set, but requires a reduction in the maximum performance characteristics of the cross-cutter, in order to be able to keep within reasonable limits the accelerations and decelerations which occur. Thus, e.g. with a synchronous length of cut of 325 mm in the case of a reduction of the length of cut to 280 mm by a drive with varying velocity ratio, the machine speed must be reduced from 350 to 150 m/min, i.e. more than halved.

DE-A-3,608,111 discloses clamp collars by means of which the synchronization gears can be fixed to the knife shafts. These clamp collars have a rotating gap filled with a pressure medium. As a result of the rotating gap a certain radial elasticity existed making it possible to set the somewhat eccentrically manufactured gear at one point of the circumference to a minimum backlash. The radial elasticity prevented a seizing of the gears.

Backlash is defined by Webster's Universal Unabridged Dictionary, 1936 Edition, as the backward surge of a pair or a train of toothed wheels acting under a variable driving pressure; the loose play of such a part. Backlash equals the clearance allowance between the flanks of the teeth in gear.

U.S. Pat. No. 3,182,540 discloses a paper cross-cutter, which carries on a knife shaft numerous knives, which cooperate with a roller-like counterroll for performing a squeezing cut. On it surface the counterroll has raised and lowered areas, so that through a specific reciprocal configuration of knife shaft and counterroll only certain knives perform the squeezing cut in each case, so that a different format length can be set.

It is also known from German Patent 602,721 to engage for cutting purposes only two knife shafts equipped in each case with knives by means of a hand lever. As a result of a cam control they are forced apart again subsequently.

DE-A-4,005,028 describes two knife shafts equipped with knives, which use the opposing knife shaft as an anvil roller for performing a squeezing knife cut. As a result of a corresponding knife configuration alternately longer and shorter portions (intermediate strips) can be cut out.

SUMMARY OF THE INVENTION

The object of the invention is to provide a working machine for material webs, which offers improved setting possibilities for two rotatable machine parts. In particular a cross-cutter improved compared with the prior art, is to be provided, which has a better adaptability to the operating conditions and in particular permits an adaptation to different lengths of cut without or with only slight losses of cutting speed and without any significant conversion costs.

According to the invention means are provided for minimizing the backlash in at least one circumferential sector of at least one gear.

For paper working machines it is necessary for different processes, particularly for the accuracy of cut and the service life of the knives of cross-cutters, to have an extremely accurate setting of the machine parts. These must also be respected under all operating conditions. Particularly in the case of drives with a varying velocity ratio as a result of a small clearance between the synchronization gears it was possible for the setting of the accurate cutting gap between the knives to be impaired. With the knowledge that it is almost impossible to so precisely work a gear pair that it operates in an absolutely backlash-free manner over the entire circumference, it is therefore provided that on all the points critical for the cutting process the backlash is brought to zero by manual adjustability, whereas in the intermediate portions a certain backlash can be allowed. This can be achieved in that the gear is so radially widened preferably by hydraulic clamping means or e.g. mechanically by screw-in wedges or cones, at the points where the individual knife sets come into cutting engagement, that there is a so-called beat eccentricity, or high point, or point of greatest eccentricity, and the gear functions without backlash at this point.

The possibility of setting the backlash at different sectors makes it possible to provide several sector setting means over the circumference of a gear. This can be brought about by sector deformation, that is, deformation of a sector of the working circumference of the gear with respect to the rotational symmetry. The tooth profiles can be displaced in the corresponding sector in the direction of the gear in engagement therewith, e.g. in the case of an externally toothed gear by a slight widening of the gear rim in this sector.

It is consequently possible to provide on the circumference several points running in substantially backlash-free manner, which can be used on the one hand for a precise setting of an engagement between two parts, e.g. an interplay between two knives accurate to hundredths of a millimeter, but on the other also avoids impacts in the case of strong load reversals, such as occur with the aforementioned drives with varying velocity ratio.

A particularly advantageous embodiment has a pressure medium pocket restricted to one circumferential portion of the gear and into which is pumped a liquid pressure medium, e.g. hydraulic fluid. This pressure medium pocket, e.g. a narrow slot extending circumferentially over a certain sector within the tooth system can also be closed to the outside by a weld and can be connected to a pressure medium feed line by means of a shutoff valve. The size of the sector, i.e. the length of the slot in the circumferential direction can be adapted to the requirements over the length of the backlash-free area. Even if it is only necessary to have a zero backlash in the vicinity of a single tooth, the pressure medium pocket will extend over several teeth in order to bridge the gap with the minimum divergence from the circular shape. Through a different thickness and shape of the web formed between the pressure medium pocket and the tooth system, it is possible to influence the shape of the widened portion. The profile of this web can also be used axially for influencing the bending line and therefore the outer contour of the gear in the micron range.

The sector setting possibility is particularly advantageous in the case of cross-cutters having several knives on both knife shafts and which are so set with respect to one another that different cutting engagements form in a specific rotation position association of the knife shafts to one another. Thus, instead of having to replace the knife shafts during a format change or by means of the aforementioned drives with varying velocity ratio having to bridge the complete difference between the knife shaft circumference and the format length by acceleration and deceleration, it is possible to modify the synchronous length of cut. As the knives are used at different circumferential positions of the knife shaft and must be oriented with respect to one another with an accurate, minimum cutting gap, the gears synchronizing to two knife shafts can be set by means of the sector setting means to prevent backlash at the engagement positions.

For changing the knife set, i.e. the synchronous length of cut, the two knife shafts undergo a change to their reciprocal rotation position association. This could be brought about in that the gears synchronizing the two knife shafts with one another are disengaged and then reengaged in a new reciprocal association. Preferred setting means can have at least one, more particularly pressure medium-operated locking coupling provided with a radial tooth system. This radial tooth system can be located between two collars, whereof one is connected in non-rotary manner to the particular knife shaft and the other to a synchronization gear of a knife shaft. These radial tooth systems can be bridged by a corresponding radial tooth system on an axially movable connecting body. The latter forms a positive detent, which is only loaded in shear and can be made backlash-free by a corresponding tooth construction. Such setting means can be provided for the connection of the knife shafts by two synchronization gear sets on each of the said gear sets.

In the case of engagement of one knife set the knives of the other knife set pass through the cutting gap without there being a corresponding counterknife there. In the case of knife shafts in which the knives scarcely project above the knife shaft surface, it is appropriate to provide at the points where one knife of the other knife shaft passes through the cutting gap a passage, e.g. a recess in the knife shaft surface, so that the material web, which is not to be cut at this point, can optionally give way here. It must be borne in mind that the material web normally comprises several layers, which during the cutting the paper webs are brought together from several individual rolls to form a common layer passed through the overall machine. In the form of such layers they are longitudinally and transversely cut, superimposed in scale or flake manner, stacked and then removed in reams.

In order to avoid damage to the material web passing by the knives which are not in engagement or at least so as to minimize this, particularly in the case of knives which project over the knife shaft surface, it should be ensured that the circumferential distance between the knives of the different knife sets is as large as possible. With a knife shaft arrangement having a two and a three knife set, the knives being displaced against one another by 180° and 120°, the arrangement can be such that the minimum distance between two knives of different knife sets is 30°. For example in the case of sensitive papers, it would be possible to provide covers for knives not involved in the cutting operation, e.g. to provide behind a projecting upper knife a swing-out cover, which covers or is connected to the cutting edge.

Through the invention it is possible to cut several formats with or very near to the synchronous length of cut. Thus, e.g. the standard formats of 11 and 17 inches in the USA are approximately in a ratio of 2:3 to one another. DIN formats with 1.41 or 2.0 to the in each case larger size have ratios close to 2:3 or 1:2. For the latter it is appropriate to have knife sets of in each case 1 and 2 or 2 and 4 knives. Minor divergences can be bridged by per se known methods using a drive with varying velocity ratio, e.g. a direct motor drive according to DE-A-3,608,111, without any significant losses to the production speed.

It is also possible to use knife sets with different characteristics, such as material (steel/hard metal), construction, setting and in particular cutting angle configuration and the like. In each case optimum conditions can be obtained for different operating conditions and material web types without requiring any knife shaft change. It is also possible to use two knife sets of the same type and same number of knives under the standpoint of extending the service life between knife changes.

In a preferred construction of a cross-cutter, particularly for small paper formats, on the two knife shafts driven in synchronized opposing manner are provided two knife sets, which are so displaced against one another on both knife shafts that in a specific rotation position association of the two knife shafts only one of the sets is in engagement, whereas the other knives pass through the cutting gap without cooperating with a corresponding counterknife. This makes it possible for one knife shaft set to implement several synchronous lengths of cut by merely changing the reciprocal rotation position association of the knife shafts.

These and further features can be gathered from the claims, description and drawings and the individual features, both singly and in the form of subcombinations, can be implemented in an embodiment of the invention and in other fields and can represent advantageous, independently protectable constructions for which protection is hereby claimed. The subdivision of the application into individual sections and the intermediate headings in no way limit the general nature of the statements made therein.

BRIEF DESCRIPTION OF THE DRAWINGS

An embodiment of the invention is described in greater detail hereinafter relative to the attached drawings, wherein.

DETAILED DESCRIPTION OF THE PREFERRED EMBODIMENTS

Figure 1:
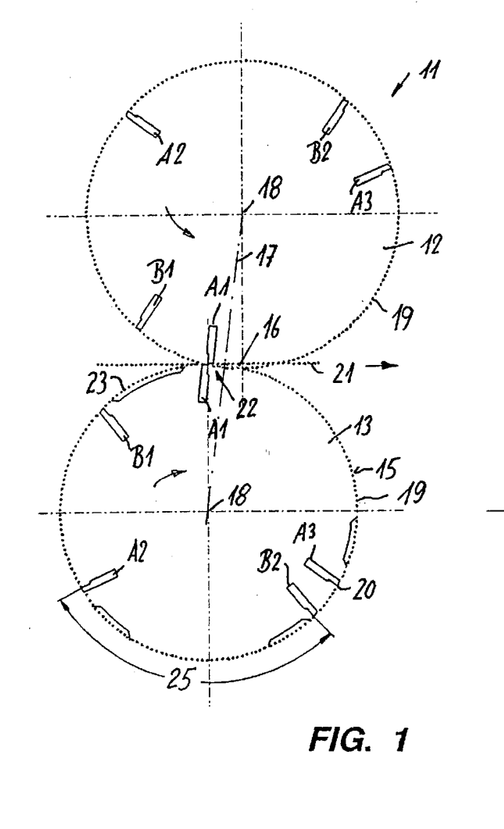
FIG. 1 is a diagrammatic side view of two cooperating knife shafts in engagement position of a knife set.
Figure 2:
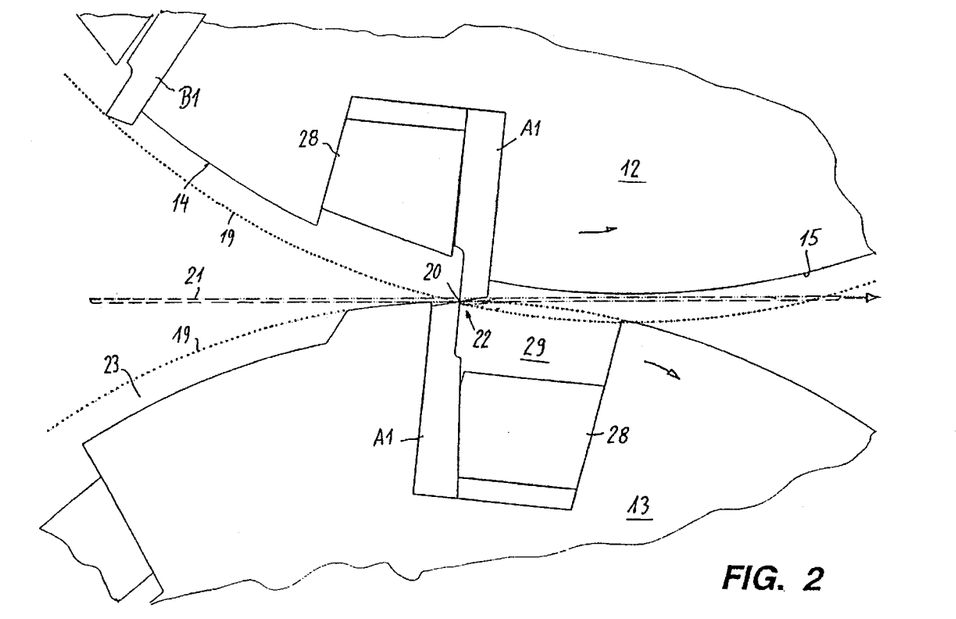
FIG. 2 is a larger-scale detail of FIG. 1.

With reference to FIGS. 1 and 2, a cross 11 has two knife shafts 12,13, which are driven synchronously in opposition to one another in a manner described hereinafter relative to FIG. 7. The knife shafts are in part over 2000 mm long, usually hollow drums of high strength materials, which in the case of a minimum weight are to have a maximum flexural and torsional stiffness. In clamping or fixing devices 28 are adjustably fixed five knives on each knife shaft belonging to two knife sets A and B (FIG. 1). The knife set A contains three knives A1 to A3 arranged with a uniform spacing of 120° on the circumference of the knife shaft, whereas the two knives B1 and B2 of the knife set B are in each case 180° from one another on the circumference. To avoid an excessively hard cut the knives can be given a slight helical stagger.

On the upper knife shaft 12 the knives of the two knife sets A and B are so positioned with respect to one another that they do not drop below a certain circumferential distance. With the chosen arrangement 2/3, as shown in FIG. 1, there are 30° between knives A1 and B1 or A3 and B2.

As can be gathered from FIG. 2, the knives of the upper knife shaft 12 project somewhat over the knife shaft surface 14 and are introduced into small recesses 29, which are provided in the vicinity of the knife cutting edge 20 in the knife shaft surface 15 of the lower knife shaft 13. The knives of the lower knife shaft 13 do not project over the knife shaft surface 15.

FIG. 1 shows the cutting engagement between the knives A1. It can be seen that the cutting gap 16, i.e. the area of the knife shafts located in the vicinity of the connecting line 17 between the axes 18 of the knife shafts 12,13 where they are closest together and in which the travel circles 19 of the knife cutting edges 20 overlap, is traversed by the material web 21. The knives are slightly inclined with respect to the radial to the knife shaft, so that during insertion in the cutting position 22 shown in FIG. 1 they are aligned with one another in the longitudinal direction.

Cutting takes place on passing through this cutting gap 16. During the further rotation of the knife shafts, in the case of a synchronous length of cut 25, the material web 21 passes through the cutting gap with the same speed as the peripheral speed of the travel circles 19 of the knife cutting edges 20.

Figure 3:
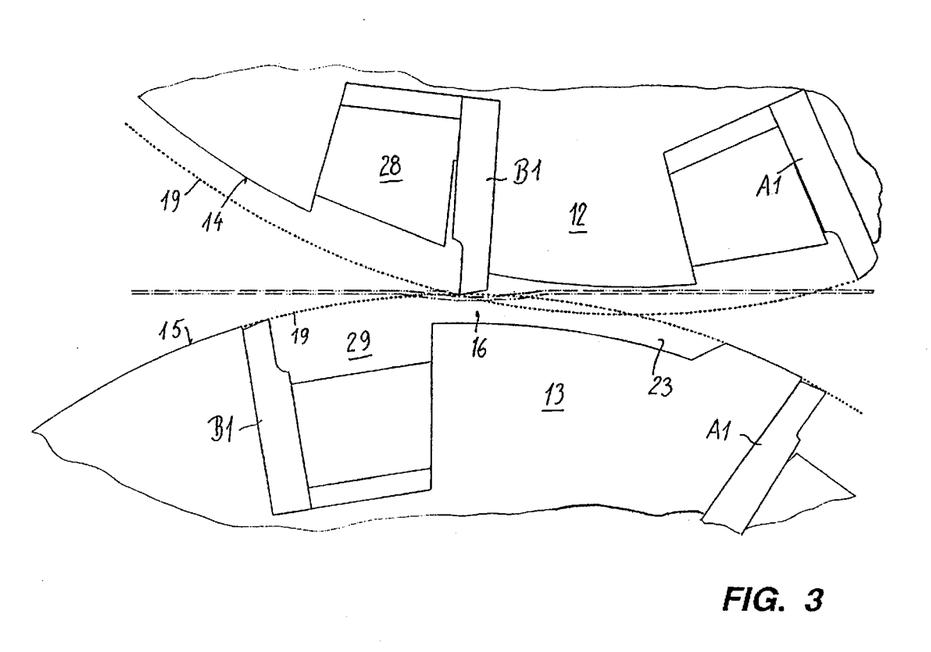
FIGS. 3 and 4 are representations corresponding to FIG. 2 in each case during an inactive knife passage through the cutting gap.

In the case of a length of cut differing from the synchronous length of cut 25 the knife shafts are accelerated or decelerated and consequently run at a speed different from the material web 21 until shortly before the entry of the next knife combination A2, where the synchronous speed is restored. However, between these two positions the knives B1 pass through the cutting gap 16, but with a clear circumferential spacing, so that no cutting takes place (FIG. 3). Due to the projection of the knife B1 over the upper knife shaft 12 a recess 23 is provided in the knife shaft surface 15 of the knife shaft 13 which forms a passage for the material web 21 below the knife B1 and which is so deep that the knife is removed from its bottom at least by the material web thickness. A slight deflection of the material web at right angles to its running direction in this area is at its least prejudicial if the circumferential spacing of the here inactive knife from the cutting position 22 is as large as possible. In particular this should be the aim with respect to the upper knife if it projects over the surface 15.

Figure 4:
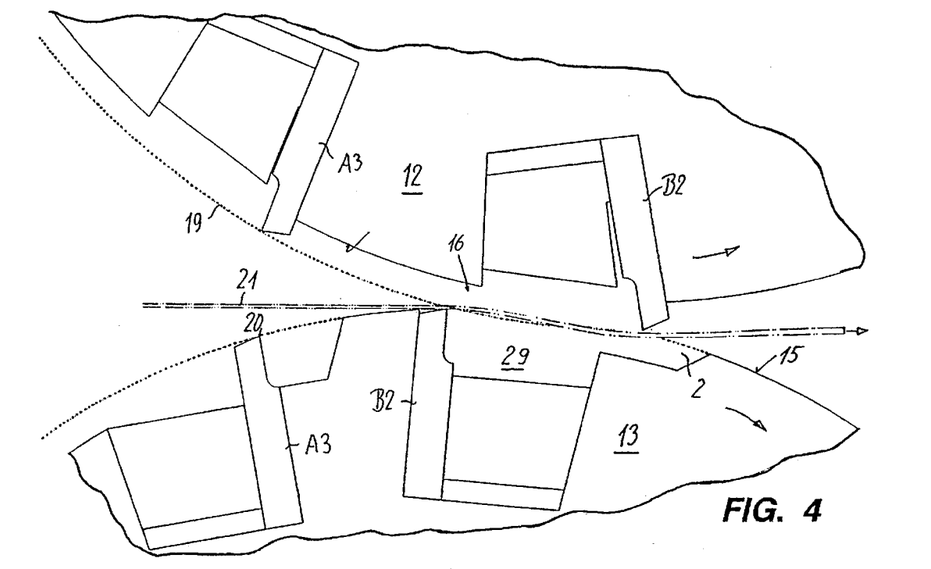

FIG. 4 shows the passage of the knives B2 through the cutting gap 16 and which at the lower knife shaft 13 are closer (15°) to the following knives A3 than to the upper knife shaft 12. It is also possible to see there the moving aside of the material web 21 into the recess 23, which can follow on directly to the recess 29.

Figure 5:
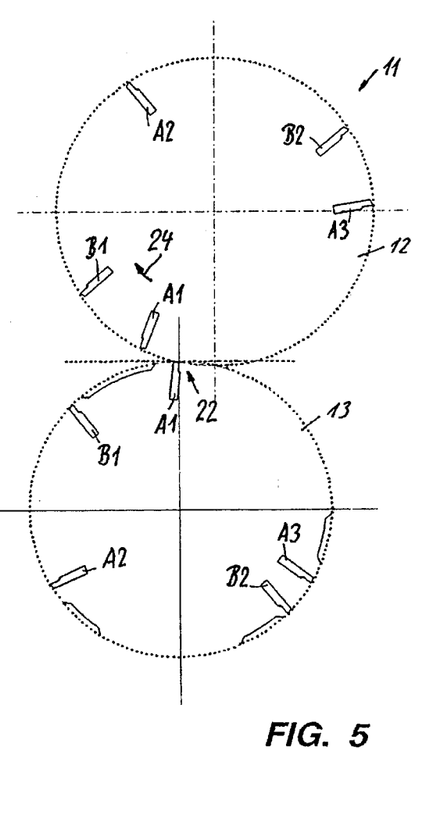
FIG. 5 shows the knife shafts according to FIG. 1 during adjustment for the engagement of a knife set.
Figure 6:
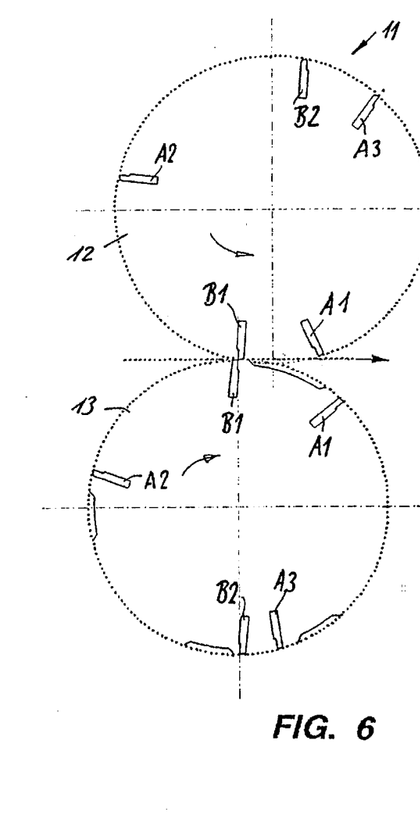
FIG. 6 shows the knife shafts in cutting engagement of the second knife set.

FIG. 5 diagrammatically shows the adjustment of the two knives in order to pass from the engagement position of the knife set A (FIG. 1) to the engagement position of the knife set B (FIG. 6). If the knife shafts are in the position according to FIG. 1, obviously with the drive shut down, the synchronization between the two knife shafts is ended and the upper knife shaft is rotated in the direction of the arrow 24 until the knife set B is in the engagement position, i.e. the knives B1 and B2 on the knife shafts 12 and 13 have in each case the same circumferential spacing from the cutting position 22. This can take place by adjusting by a specific, predetermined angle of adjustment, in the present case 15°. There is no longer any need for a manual readjustment.

As only the upper knife shaft 12 was adjusted, in the lower knife shaft the distances between the knives are different to those for the upper shaft. It is clear that in this case the stagger between the two knife sets A and B differs by said 15° angle of adjustment, in that now in place of the same distance 30° between the knives B1,A1 and B2,A3 of the upper knife shaft 12 for the lower knife shaft 13 the distance between B1 and A1 are 45° and between B2 and A3 only 15°. This arrangement can vary according to the adjustment procedure and other circumstances. In the case of the lower knife shaft 13 these distances or spacings are also uncritical, because the knives do not project over the knife shaft surface 15.

It can be seen in FIG. 4 that the lower knife A3 can follow the knife B2 with a short interval without problems occurring in the cutting gap. As is visible in FIG. 4, there is then a cutting engagement between the knives of the set B, whereas the knives of set A pass in inactive form through the cutting gap. The synchronous length of cut 25, which is in FIG. 1 120° or ⅓ of the knife shaft circumference, is now in FIG. 4 180° or ½ of the knife shaft circumference, without anything on the knife shaft being changed other than the reciprocal rotation position association of the two knife shafts 12,13 and for this purpose the machine only has to be very briefly stopped.

Through a skilled utilization of the different knife sets it is also possible to obtain intermediate formats not achievable by corresponding spacing or pitch ratios with only a slight intermediate acceleration or deceleration of the knife shafts. It can in particular be ensured that the main formats representing the greatest production volume can be obtained with the maximum production line speed, whilst even in the case of secondary formats an acceptable speed range can still be maintained. A further advantage is the reduced loading of the machine by the drive with varying velocity ratio and the greater service life of the knives, which are only used during part of the entire machine operating period. Although the construction with two knife sets and a relatively small number of knives per set is appropriate for manufacturing reasons, it is possible to provide more than two knife sets and/or knife sets with a larger number of knives. The variation possibilities with respect to the synchronous lengths of cut increase as a result of this. When knives are located on both knife shafts it must be ensured that the knives of the knife sets are so arranged that in each cutting-active rotation position association only one set engages with the corresponding set of the other knife shaft and a single knife can optionally also belong to different sets.

Figure 7:
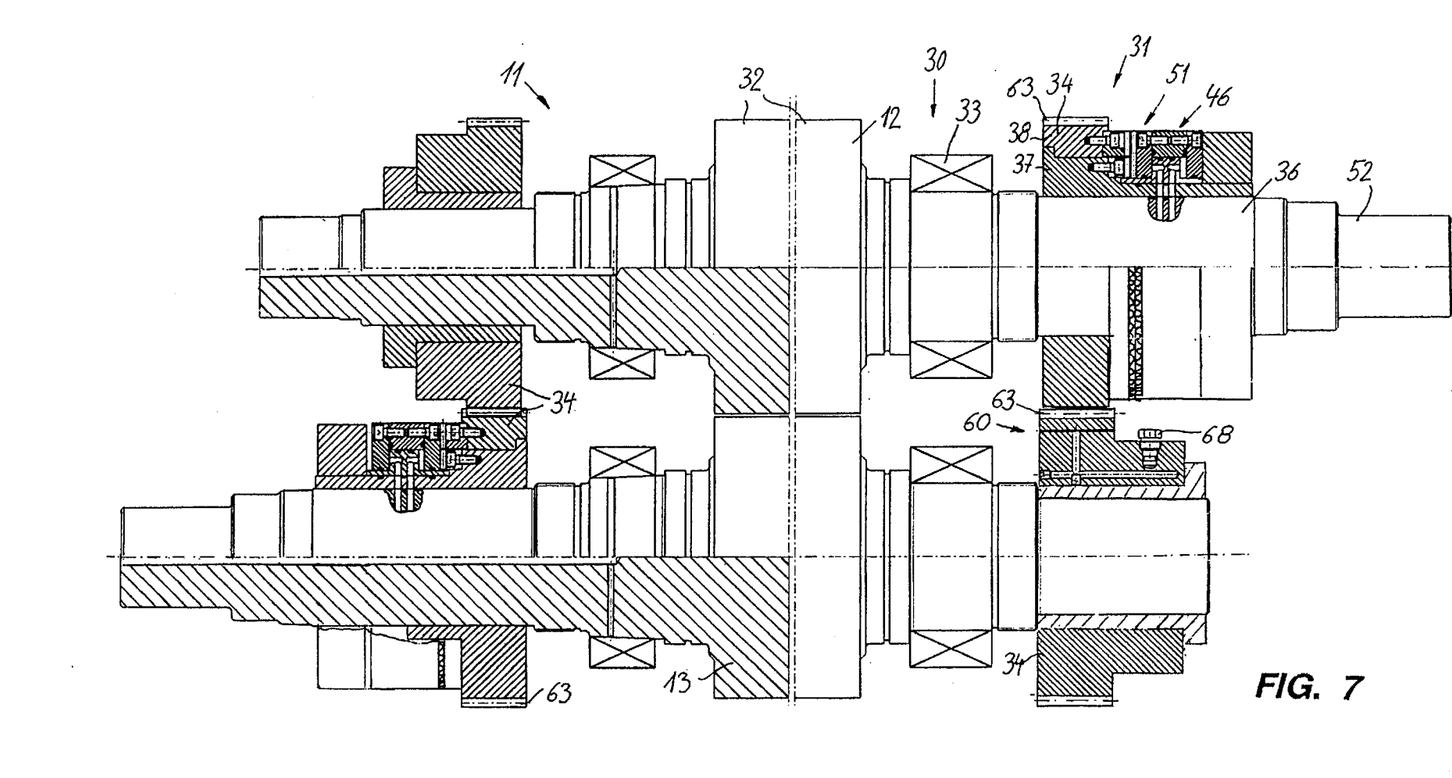
FIG. 7 is a part section through the end portions of two knife shafts.

FIG. 7 shows the knife shafts 12,13 and in particular their mounting support 30 and synchronization means 31, whilst the knife-carrying knife shaft portions 32 are shown in shortened form. On either side of said active knife shaft portions 32 are provided bearings 33, to which are connected the knife shaft synchronizing means 31. The latter is provided on both sides of the knife shafts and contains synchronization gears 34, which engage in one another and synchronize the two shafts in opposition with one another. They are fixed by special clamp collars to the corresponding shaft portion 36. Such clamp collars are described in DE-A-3,608,111.

Figure 8:
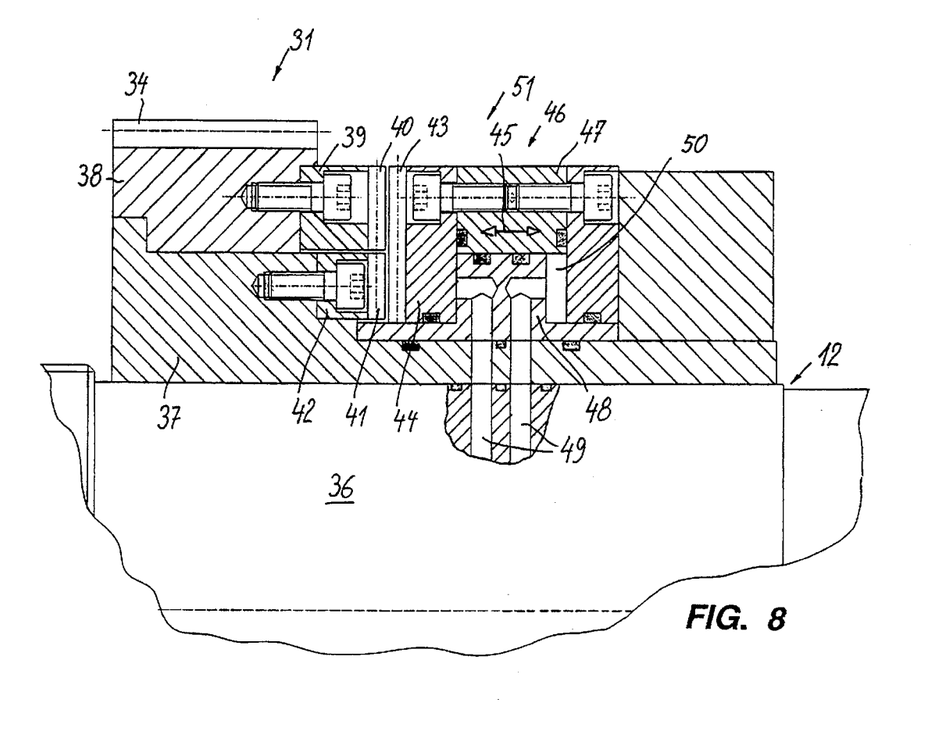
FIG. 8 is a detail of FIG. 4.

In each case one synchronization gear 34 of each gear pair is arranged in rotary manner on a hub body 37 retained by the clamp collar, so that the gear forms a rotary ring 38. FIG. 8 more particularly shows that to it is fitted a collar 39 with a radial tooth system 40, which is aligned with the radial tooth system 41 of a collar 42 fitted to the hub body 37 radially within the same.

Facing the radial tooth systems 40,41 is a matching radial tooth system 43 on a circular connecting body 44, which is axially displaceable in the direction of the arrow 45 by means of a hydraulic drive 46. The latter is a circular hydraulic cylinder, which has a circular cylinder portion 47 with a U-shaped cross-section on whose one front side is provided the radial tooth system 43.

The piston 48 of the hydraulic cylinder is formed by a ring portion firmly connected to the hub body 37 and which engages in a U-shaped cylinder portion 47. Through the knife shaft hydraulic channels 49 pass into the piston and from there to either side of the pressure medium chamber 50 formed between the piston 48 and the cylinder 47.

By a corresponding pressure medium action the cylinder portion 47 with the radial tooth system 43 is axially displaceable in the direction of the arrow 45. The setting means 51 formed by the collars 39,42, the radial tooth systems 40,41,43 and the hydraulic drive 46 are shown in the adjustment position in FIG. 8 in which the radial tooth systems are not in engagement with one another, so that the adjustment of the upper knife shaft with respect to the lower knife shaft shown in FIG. 5 can be carried out. For this purpose both setting means 51 (in FIG. 1 to the right on the upper knife shaft 12 and to the left on the lower knife shaft 13) are disengaged. The rotation of the upper knife shaft e.g. marked by a corresponding marking or brought about by a corresponding rotation angle control of the drive is then carried out. The hydraulic drives 46 are then operated again and press the radial tooth system 43 extending over the two radial tooth systems 40 and 41 into the latter, due to a certain wedge shape of the tooth system performs a precise orientation and once again connects in positive and absolutely backlash-free manner the corresponding knife shafts 12,13 to the associated synchronization gear 34. During operation the hydraulic pressure is maintained. With this type of locking coupling following a relatively rough rotation to be carried out automatically or manually by the operator it is possible to have a repeat-accurate synchronization in the new position in the micro range. The hydraulic drive simplifies operation. It would also be possible to provide a mechanical and optionally manually operable coupling means.

FIG. 7 also shows a device for the sector setting of the backlash provided in one of the synchronization gears 34. It could be provided in all four synchronization gears, but at least in one gear per gear pair. The backlash setting means 60 are shown in detail in FIGS. 9 and 10. In the gear body 61 of the synchronization gear 34 at the points where a cutting engagement can occur slots 62 are provided, which extend axially over the entire gear width and are so curved circumferentially that the portion 64 of the gear body between them and the tooth system 63 has a uniform thickness in the present embodiment. The slot 62 can e.g. be made by a laser cut. Axially the slots 62 are closed by a weld 65, so that they form a substantially closed pressure medium pocket 66. The slot extends over a sector with a circumferential angle S, which is dependent on the contour of the eccentricity of the sector S which is to be minimized, the height of the eccentricity which is to be minimized and the thickness of the portion 64. In the represented embodiment the sector S, i.e. the pressure medium pocket extends over approximately 40°.

Figure 10:
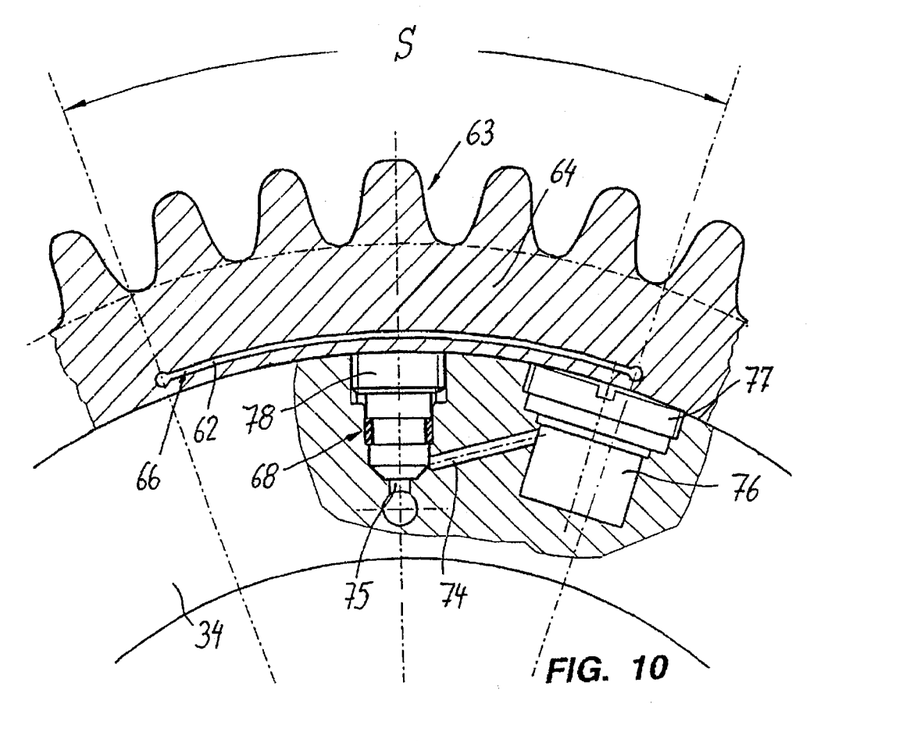
FIG. 10 is a section along line X in FIG. 9.

The pressure medium pocket 66 is connected by means of bores 67 to a valve 68, which is located outside the gear area on a hub portion 69 of the gear and is operable from the outside by means of a key face 70. The valve, whose valve body is a multiple offset screw bolt with a frustum-shaped valve face 71, which cooperates with a correspondingly shaped valve seat 72, is sealed by a circumferential joint 73. The valve inlet is a sloping bore 74, which somewhat above the valve seat passes laterally into the valve bore, whereas the valve outlet is a central bore 75 communicating with the bores 67. The inlet bore 74 is connected to a pressure medium connection 76, which can be closed by a locking screw 77 (FIG. 10). Each pocket 66 is connected to its own connection 76 via its own valve 68. The sector setting of the backlash is performed in the following way. Following the installation of the gear pair, firstly and in known manner, an adjustment is made to the backlash over the entire circumference. This can e.g. take place by an axial displacement of the gears against one another if they have a slightly conical shape. Such a process is described in DE-A-3,608,111. However, after this adjustment a certain minimum backlash must remain, so that there is no pressure which displaces the lubricant and destroys the tooth profiles, e.g. by Hertz calculated stresses and which could lead to the destruction of the gears. A freedom from backlash should be set only on very small circumferential portions.

Figure 9:
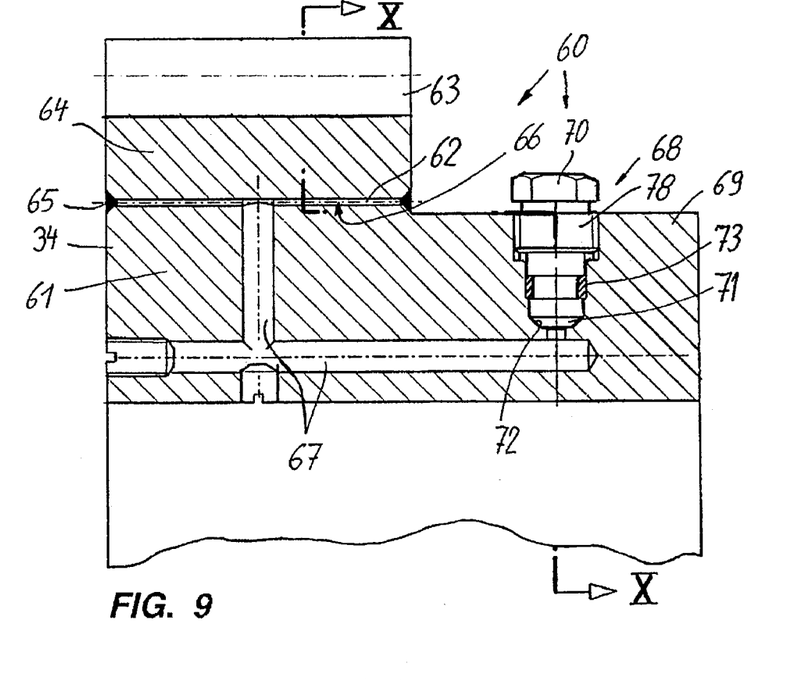
FIG. 9 is a detail of FIG. 7.

Subsequently this backlash freedom is individually set on other sectors of the gear. For this purpose, a pressure medium source is connected to the pressure medium connection 76, e.g. a hydraulic hand pump, which can produce a relatively high pressure of 1000 bar or higher. This pressure is passed via the valve 68 into the pressure medium pocket 66 and "blows" up the latter, in that the portion 64 and therefore the tooth system 63 is slightly outwardly deformed. This leads to a partial sector of the tooth system, which can e.g. be two to three hundredths of a millimeter. After the desired prevention or limitation of backlash has been obtained, the previously opened valve 68 is closed by screwing in the valve body 78 and the pressure medium source can be removed. In this way successively all the sectors, whereof several are present over the gear circumference, are set to the desired minimum backlash or clearance. In the case of a gear pair it is normally sufficient if one of the gears has the sector setting possibility. However, it could also be provided on both the gears of a pair and the respective facing sector high point eccentricities could be summed at the corresponding points if the high point eccentricities meet each other at each revolution, or corresponding combinations could arise by a corresponding reciprocal staggering of the sectors, particularly for gear pairs with unequal numbers of teeth.

When using a clamping sleeve according to DE-A-3,608,111 an additional radial resilience can be obtained, which also with corresponding diameter changes, e.g. thermal influences, prevents inadmissible pressing stresses.

On the shaft ends 52 engages the drive, preferably in the form of a short periodic, speed-variable, direct current motor with a corresponding control (not shown).

What is claimed is:

1. A working machine for material webs, comprising:

two machine parts rotatable in opposition to one another;

at least one pair of toothed gear wheels synchronizing said two rotatable machine parts with one another each gear wheel connected to a respective one of said machine parts, each of said gear wheels having at least one gear body and a toothed gear rim integral with said at least one gear body; and, at least one of said gear wheels having means for deforming its gear rim radially outwardly to minimize backlash between the teeth of said gear wheels, said deforming means including a separate slot-shaped pressure medium pocket at each of a plurality of circumferential positions, each of said pockets locally deforming said gear rim in a radial direction when separately pressurized by a liquid pressure medium.

2. A working machine according to claim 1, wherein said slot-shaped pressure medium pocket is closed on all sides and intends substantially in the circumferential direction.

3. A working machine according to claim 2, wherein said slot-shaped pressure medium pocket extends closely adjacent to said toothed gear rim.

4. A working machine according to claim 1, wherein said rotatable machine parts carry at least one knife each, which cooperate with one another in a cutting engagement to sever said material webs, said deforming means being disposed at the circumferential positions to control said backlash during said cutting engagement.

5. A working machine according to claim 1, further comprising:

a pressure medium feed line for each of said pressure medium pockets; and, a plurality of shutoff valves, each of said shutoff valves communicating between one of said pressure medium pockets and its respective pressure medium feed line, each of said pressure medium feed lines being connectable to an external source of said pressurized fluid medium.

6. A working machine according to claim 1, wherein said slot-shaped pressure medium pockets are cut into the gear body by a laser.

* * * * *